(12) United States Patent
Shiota

(10) Patent No.: US 6,169,596 B1
(45) Date of Patent: *Jan. 2, 2001

(54) PHOTO FINISHING SYSTEM

(75) Inventor: Kazuo Shiota, Tokyo (JP)

(73) Assignee: Fuji Photo Film Co., Ltd., Kanagawa-ken (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/979,568

(22) Filed: Nov. 26, 1997

(30) Foreign Application Priority Data

Nov. 27, 1996 (JP) .................................... 8-316701

(51) Int. Cl.$^7$ .................................................. G03B 27/52
(52) U.S. Cl. ................................................ 355/40; 355/77
(58) Field of Search ........................... 355/40, 41, 77, 355/68; 358/527, 487

(56) References Cited

U.S. PATENT DOCUMENTS

| | | | |
|---|---|---|---|
| 4,972,068 | * 11/1990 | Ohtani et al. ...................... | 235/454 |
| 5,039,847 | * 8/1991 | Morii et al. ....................... | 235/379 |
| 5,184,227 | * 2/1993 | Foley .................................. | 396/335 |
| 5,319,401 | * 6/1994 | Hicks .................................. | 355/40 |
| 5,327,265 | * 7/1994 | McDonald ......................... | 358/527 |
| 5,359,387 | * 10/1994 | Hicks .................................. | 355/40 |
| 5,440,401 | * 8/1995 | Parulski et al. .................... | 386/124 |
| 5,477,353 | * 12/1995 | Yamasaki ........................... | 358/487 |
| 5,512,396 | * 4/1996 | Hicks .................................. | 355/40 |
| 5,546,196 | * 8/1996 | Huot et al. .......................... | 355/40 |
| 5,608,542 | * 3/1997 | Krabe et al. ....................... | 358/487 |
| 5,706,097 | * 1/1998 | Schelling et al. ................. | 355/40 |
| 5,745,218 | * 4/1998 | Sugawara et al. ................. | 355/40 |
| 5,748,285 | * 5/1998 | Akira ................................... | 355/40 |
| 5,767,945 | * 6/1998 | Fields et al. ....................... | 355/77 |
| 5,799,219 | * 8/1998 | Moghadam et al. .............. | 355/40 |

* cited by examiner

Primary Examiner—D. Rutledge

(57) ABSTRACT

In a picture printing service, a customer can enjoy convenience equivalent to that in a network photo service by using a simple and reliable method, without special equipment, while a service provider can carry out order receiving processing without wasting time. When picture image data read from a film by using a film scanner are stored in an image server, search ID information of the picture image data to be used for searching for the picture image data is printed on a predetermined sheet or the like by using a printer in a format of an order sheet or the like to be used by a customer upon placing an order.

20 Claims, 1 Drawing Sheet

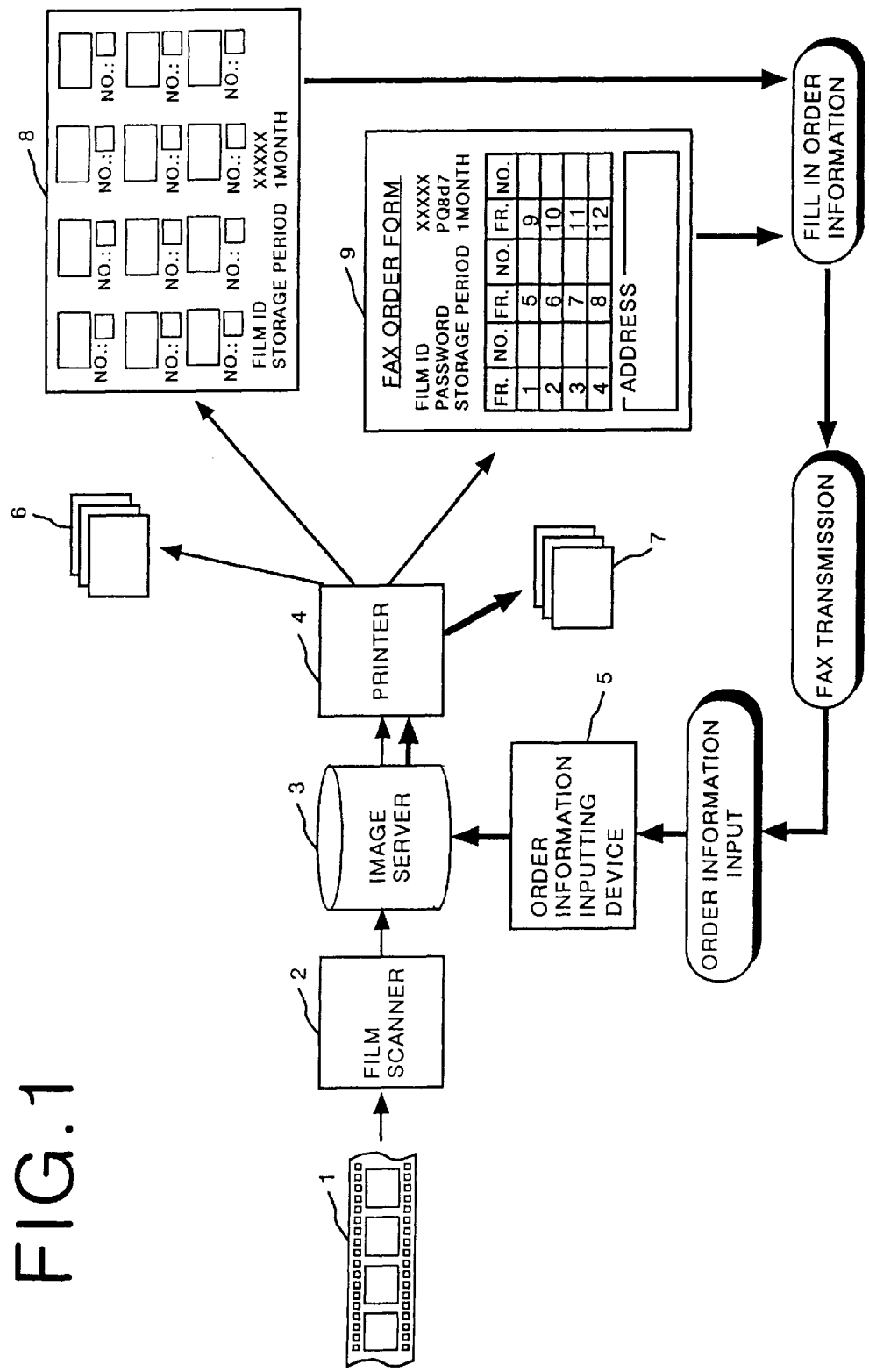

PHOTO FINISHING SYSTEM

BACKGROUND OF THE INVENTION

1. Field of the Invention

The present invention relates to a photo finishing system whereby picture image data is stored upon generating a print thereof and used for generating an extra print or the like of the picture image.

2. Description of the Related Art

A network photo service system wherein picture image data read from a film or transferred from a memory of a digital camera is stored in a hard disc of a server computer installed in a laboratory or a DPE and a customer orders an extra print or the like by accessing the server computer via a network has been proposed.

According to the network photo service, a customer can order a print from home or office, and can receive the print without going to a DPE by using a mailing or delivery service. For a service provider, prompt processing and reduction in labor cost can be achieved, since the service provider does not need to deal with a film when generating an extra print. Therefore, the spread of the network photo service is expected.

The above network photo service assumes that customers possess personal computers and can access a server computer installed in a DPE or the like. However, personal computers or the Internet are still less popular than cameras. In actual fact, most customers do not possess personal computers, or have not used a network even if they have a computer.

As has been performed conventionally, a service provider may print a specified frame in a film by reading the film deposited by a customer when an extra print is ordered by such a customer described above. However, from the viewpoint of operation efficiency, it is more preferable to use image data stored in a server computer than to reread a film. Therefore, a system has been desired which can easily search for picture image data having been stored in a server computer in response to an order placed by a customer.

SUMMARY OF THE INVENTION

Based on consideration of the problems described above, an object of the present invention is to provide a photo finishing system whereby order receiving processing which saves the time of a service provider can be carried out and a customer can enjoy convenience equivalent to the convenience in a network photo service by using a simple and reliable method, without having special equipment.

The photo finishing system of the present invention is a photo finishing system comprising a processor which records and stores a picture image whose print has been ordered in a predetermined storage as picture image data and a printer which prints search ID information of the picture image data stored in the predetermined storage on a predetermined recording medium in a predetermined format.

The "picture image whose print has been ordered" herein referred to includes a picture image recorded by either a camera using a film or a digital camera.

"The predetermined storage" means a hard disc or the like of a server computer installed in a DPE or a laboratory, and the "search ID information of the picture image data stored in the predetermined storage" means the information necessary for identifying the picture image data in the hard disc. For example, in the case where the file name used for storing picture image data in the hard disc is determined by combining the film ID and the frame number, if the file ID and the frame number are printed as the search ID information, the file name of the picture image data can be identified by using the information provided by a customer. The search ID information is printed so that a customer can place an order by looking at the information printed. Therefore, it is preferable for the search ID information to be simple and easy to understand, such as characters and numbers which can be conveyed orally. Alternatively, a bar code may be printed in addition to the characters and numbers so that the bar code may be used in order receiving processing.

The "predetermined recording medium" may be a sheet, or a picture print. However, in the case of a picture print, printing of the search ID information is carried out on the back of the picture print or in a blank space of index prints. It is also preferable for the predetermined format to be an order sheet format having blanks for the size and the quantity of the picture image print to be ordered, both of which are classified by the search ID information.

It is preferable that the printer is the means which carries out printing at the time of each print order. "Carries out printing at the time of each print order" means that one order sheet is generated for an order of first prints, for example.

When picture image data are stored, the photo finishing system of the present invention is used to print, on a sheet or the like, the search ID information used for searching for the picture image data to be stored. Therefore, if the sheet on which the search ID information is printed is provided to a customer, the customer can order a printing service while remaining at home, in the same manner as a network photo service, by reading out the search ID information printed on the sheet on the phone or by transmitting a facsimile after filling in the sheet with necessary information. Furthermore, the service provider can efficiently generate a print by using the search ID information provided by the customer for a search for picture image data, which leads to reduction in cost. In this manner, a printing service can be provided at a low cost.

If the printing is carried out at the time of each print order (at each request by which image data are stored) in the format of an order sheet for example, the format is fixed in such a manner as one order sheet for one film. Therefore, it becomes possible for an order sheet transmitted by a facsimile machine to be processed by OCR or the like.

BRIEF DESCRIPTION OF THE DRAWING

FIG. 1 is a diagram showing an embodiment of a photo finishing system of the present invention.

DESCRIPTION OF THE PREFERRED EMBODIMENT

Hereinafter, an embodiment of a photo finishing system of the present invention will be explained referring to the accompanying drawing. The photo finishing system shown in FIG. 1 comprises a film scanner 2 for obtaining picture image data by reading a film 1, an image server 3 for storing the picture image data obtained by the film scanner 2, and a printer 4 for outputting the picture image data in the form of a print. The picture image data stored in the image server 3 are searched for in response to an input from order information inputting device 5, and reprinted by the printer 4.

As shown in FIG. 1, the photo finishing system of the present invention generates a print 6 upon carrying out first print generation, while generating an order sheet 9 by printing information used for a print order on a predetermined sheet. The printer for generating the order sheet 9 may be the printer for generating a picture print, or it may be a printer other than the picture printer.

The information used for a print order means the search ID information used for searching for picture image data to be printed among plural sets of picture image data stored in the image server 3, and the search ID information may include the film ID and the frame number, for example. Alternatively, if password input is requested upon ordering a print so that a deceptive print order can not be placed, it is preferable that this password is also printed on the order sheet 9. Furthermore, the expiration date of the picture image data storage in the image server 3 or the like may also be printed on the order sheet.

The order sheet 9 has blanks for the size and the quantity of each print to be ordered, in addition to blanks for information necessary for an order, such as the address of the recipient or the like. In this manner, a customer can order a print more simply by filling in the blanks in the order sheet with necessary information such as the number of prints, and handing in the order sheet to an operator at the counter of a service provider, or by transmitting a facsimile from his/her house to the service provider. Even when a customer does not have a facsimile machine, he/she can still order a print by reading out the film ID or the like on the phone, while looking at the order sheet.

The service provider which receives an order via facsimile or by phone as described above inputs order information to the image server 3 by using the order information inputting device 5. The order information inputting device 5 may be a keyboard or the like. However, when an order sheet in a predetermined format is exchanged via facsimile or the like, information necessary for generating a print may be read automatically from the order sheet be using a scanner and OCR.

Among the plural sets of picture image data having been stored in the image server, the image server 3 searches for the picture image data identified by the film ID and the frame number having been input by the order information inputting device 5, and outputs the image data as a print 7 by using the printer 4.

The order sheet may be an independent sheet, or the back of a picture print may be used as the order sheet, with the film ID or the like being printed thereon. Alternatively, as shown by the index prints 8, the index prints 8 may be used as the order sheet by having blanks to fill in blank space of the index prints 8.

The content of the printing service which can be ordered by using the order sheet includes not only generating an extra print but also a file outputting service to a recording medium such as a floppy disc or the like. In other words, the format of the order sheet should be decided appropriately depending on the services to be provided, and the example shown in FIG. 1 is merely an example.

It is needless to say that the order sheet 9 may be printed when picture image data are transferred from a memory of a digital camera and stored in the image server 3, in the same manner as for the picture image data read from a film.

What is claimed is:

1. A non-network photo finishing system comprising:
    a processor which records and stores a picture image whose print has been ordered in a predetermined storage in the form of picture image data;
    a selecting component for selecting one or more search IDs based on a non-networked initiated customer request; and
    a print outputting device for printing search ID information of the picture image data selected on a predetermined recording medium in a predetermined format.

2. A non-network photo finishing system as defined by claim 1, wherein the print outputting device carries out the printing at the time of each print order.

3. A non-network photo finishing system as defined by claim 1, wherein the predetermined format is a format of an order sheet having blanks for the size and the quantity of prints to be ordered, both of which are classified by the search ID information.

4. A non-network photo finishing system as defined in claim 1, wherein the print outputting device carries out the printing on a print generated in accordance with the print order.

5. A non-network photo finishing system as defined by claim 2, wherein the predetermined format is a format of an order sheet having blanks for the size and the quantity of prints to be ordered, both of which are classified by the search ID information.

6. A non-network photo finishing system as defined by claim 2, wherein the print outputting device carries out the printing on a print generated in accordance with the print order.

7. A non-network photo finishing system as defined by claim 3, wherein the print outputting device carries out the printing on a print generated in accordance with the print order.

8. A non-network photo finishing system as defined by claim 5, wherein the print outputting device carries out the printing on a print generated in accordance with the print order.

9. A non-network photo finishing system as defined by claim 1, wherein the predetermined format is a format of an index print having blanks for the size and the quantity of prints to be ordered, both of which are classified by the search ID information.

10. A non-network photo finishing system as defined by claim 2, wherein the predetermined format is a format of an index print having blanks for the size and the quantity of prints to be ordered, both of which are classified by the search ID information.

11. The non-network photo finishing system of claim 1, said print output device further outputting the picture image data corresponding to the selected subset of the search ID information.

12. The non-network photo finishing system of claim 11, wherein the selecting component includes a telephone, by which a customer can convey the selected subset of the search ID information.

13. The non-network photo finishing system of claim 11, wherein the selecting component includes a facsimile machine by which a customer can convey the selected subset of the search ID information.

14. The non-network photo finishing system of claim 11, where in the selecting component includes manual delivery of the selected subset of the search ID information.

15. A non-network photo service system, comprising:
    a processor for processing and storing picture images and corresponding search IDs;
    a selecting component for selecting one or more search IDs based on a non-networked initiated customer request; and
    an output device for outputting the stored picture images corresponding to the selected one or more search IDs.

16. The non-network photo finishing system of claim 15, wherein the selecting component includes a telephone, by which a customer can convey the selected one or more search IDs.

17. The non-network photo finishing system of claim 15, wherein the selecting component includes a facsimile machine by which a customer can convey the selected one or more search IDs.

18. The non-network photo finishing system of claim 15, where in the selecting component includes manual delivery of the selected one or more search IDs.

19. The non-network photo service system of claim 15, wherein the selected one or more search IDs are identified in an order sheet having blanks for the size and the quantity of prints to be ordered, both of which are classified by the search ID information.

20. The non-network photo service system of claim 15, wherein the selected one or more search IDs are identified in an index print having blanks for the size and the quantity of prints to be ordered, both of which are classified by the search ID information.

* * * * *